(No Model.)

T. MILLER.
URN.

No. 477,261. Patented June 21, 1892.

WITNESSES:
Albert Baerenklau
Wm. J. Miller

INVENTOR
Thomas Miller
BY Henry L. Goodwin
ATTORNEY

UNITED STATES PATENT OFFICE.

THOMAS MILLER, OF JERSEY CITY, NEW JERSEY.

URN.

SPECIFICATION forming part of Letters Patent No. 477,261, dated June 21, 1892.

Application filed March 23, 1892. Serial No. 426,126. (No model.)

*To all whom it may concern:*

Be it known that I, THOMAS MILLER, residing at Jersey City, in the county of Hudson and State of New Jersey, have made certain new and useful Improvements in Urns, of which the following is a full, clear, and exact description.

This invention relates to urns of that class used for making coffee, tea, or other infusions or beverages and for producing hot water, and has for its object to largely economize fuel in most satisfactorily operating urns of this character, while at the same time promoting their durability.

The invention will first be described, and then will be particularly defined in claims hereinafter set forth.

Reference is to be had to the accompanying drawings, forming a part of this specification, and in which similar letters of reference indicate corresponding parts in all the figures.

Figure 1:
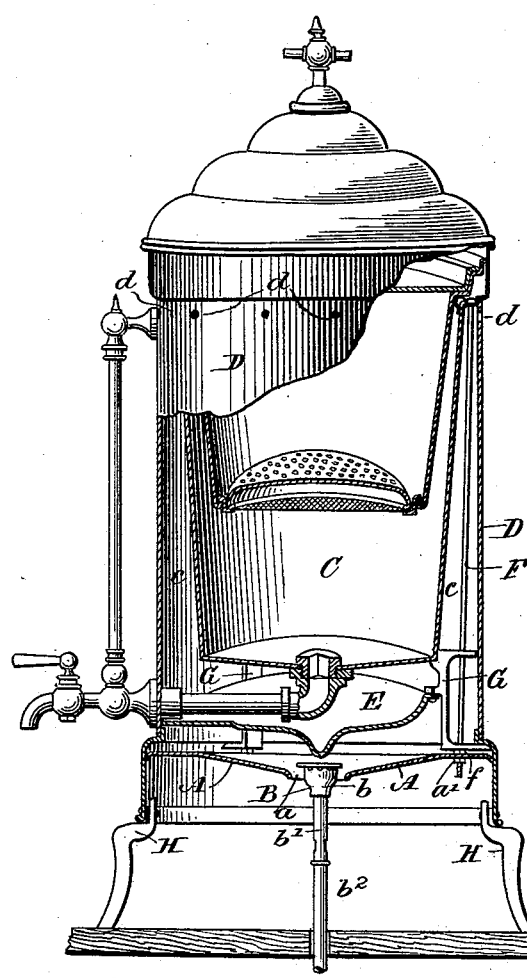
Figure 2:
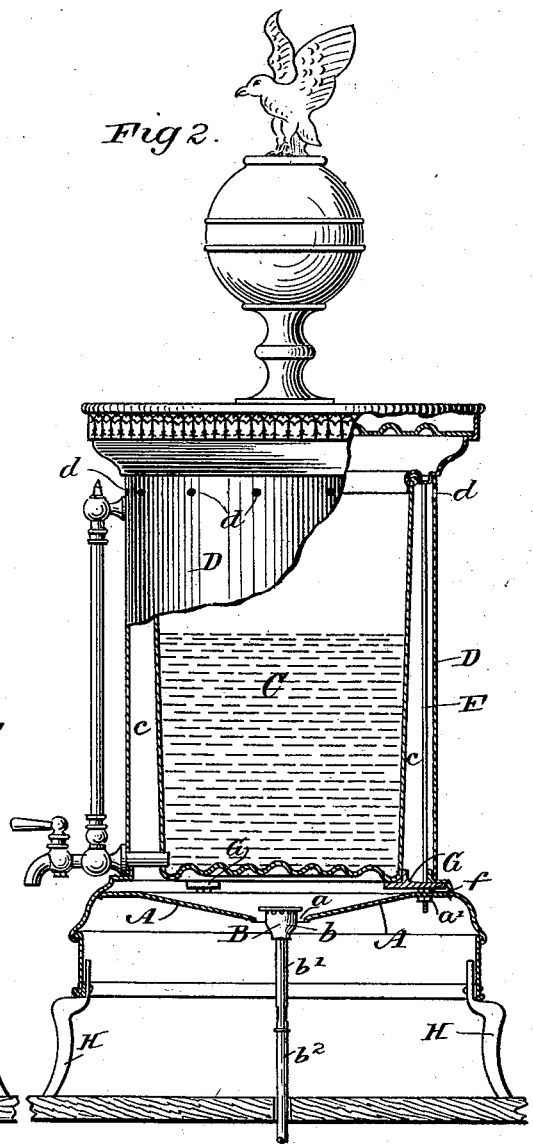
Figure 3:
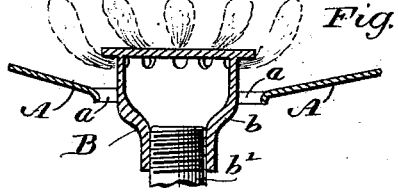
Figure 4:
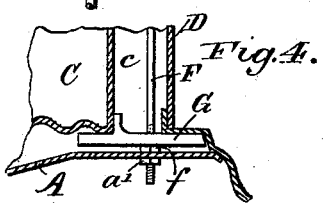

Figure 1 is a partly-broken vertical sectional elevation of a coffee or tea urn fitted with my most recent improvement. Fig. 2 is a vertical sectional view of a hot-water urn embodying the invention. Fig. 3 is a full size view of the flame-head of the comparatively small burner used to operate an urn of four or five gallons capacity, and Fig. 4 is an enlarged detail view of the fluid-receptacle clamp of the hot-water urn.

The coffee or tea urn shown in Fig. 1 of the drawings aside from the present invention embodies certain new improvements specified in another application for a patent recently filed by me, Serial No. 421,750; and the hot-water urn shown in Fig. 2 includes improvements shown in another application recently filed by me, Serial No. 420,042. My present improvements being equally well adapted to both these styles of urn, but especially to the first named, are herein shown as applied to both structures.

The present invention consists in the use of what I term a "bottom guard-plate" A, relatively with the heating-burner B, the fluid-receptacle C, and the main outer casing D of the urn. In the coffee-urn shown in Fig. 1 of the drawings the guard-plate A and burner B also have special functions relatively to a heat-deflector E, which is interposed between the burner and fluid-receptacle, and protects the latter from too direct impact of the burner-flame or heat, while allowing the heat to rise freely around the sides of the receptacle to keep its contents at the desired temperature and below the boiling-point.

The guard-plate A is preferably made removable, and is held in proper position by means of outer nuts $a'$, placed on bolts F, which, with their nuts $f$ and the clamps G, bind the removable fluid-receptacle C to and within the main outer casing D in a manner allowing convenient renewal of the receptacle when it is worn out by use or is disabled by accident, and as explained in my prior applications aforesaid. It is to accommodate this renewal of the fluid-receptacle that the bottom guard-plate A is also made removable. It will be seen that the guard-plate may be removed at any time, and without disturbing the fluid-receptacle by simply unscrewing the outer nuts $a'$ from the bolts F, which pass through the guard-plate. The double nuts $f$ $a'$ of the clamp-bolts provide for independent and quick removal of the guard-plate alone at any time to permit thorough cleaning of the ordinarily-inaccessible walls of the fluid-receptacle and main outer casing.

The guard-plate shown is fitted quite air-tight at its periphery to the main outer casing D or the base portion thereof, and the air-inlet opening $a$ of the plate is only about large enough to allow inward passage of the head $b$ of the burner, which is on a tubular stem $b'$, having air-inlet holes and a gas-inlet nipple like a Bunsen burner. The stem $b'$ connects to a pipe $b^2$, leading from any source of fluid-fuel supply.

I specially mention that the opening $a$ of the guard-plate A or that portion of said opening not filled by the burner head or stem has an area which about equals the combined areas of all the hot-air-outlet apertures $d$, made in the upper part of the main casing D. With this construction all the air admitted to the hot-air space $c$ between the outer casing and the fluid-receptacle C must enter the opening $a$ of the guard-plate and pass close to the burner-flame, and be thereby highly heated or superheated prior to having heating effect on the fluid-receptacle.

As the upper outlets $d$ for hot-air from the space $c$ have about the same aggregate area as the air-inlet opening $a$ around the burner, (or equivalent openings in the guard-plate,) it is manifest that too-quick upward draft of air through the passages $a\ c\ d$ is prevented, and the air in the space $c$ is very highly heated with little or no waste of fuel. Furthermore, actual practice proves that the air at the upper part of the space $c$ is at nearly the same uniform high temperature as the lower strata of air in said space and exerts quite the same useful heating effect. Hence the fluid-receptacle is at its bottom and sides enveloped by a most effectively heating body of very hot air, which keeps its contents at the desired temperature. Any relative proportion of the atmospheric-air inlet of the guard-plate and hot-air outlet of the casing which will assure the above-named desirable slow upward current of hot air around the fluid-receptacle is within the scope of this part of my invention.

In the coffee or tea urn shown in Fig. 1 of the drawings the infusion in the receptacle C should not boil. Hence the heat-deflector E is used to prevent this; but in the hot-water urn shown in Fig. 2 the contents of the fluid-receptacle may desirably reach the boiling-point. Hence in this structure the deflector E is not employed. The shape of the clamps G varies to accommodate the use or disuse of the deflector; but in both urns these clamps and their bolts F hold the receptacle C securely but removably within the main outer casing.

It is not essential that the air-inlet through the guard-plate A be made directly at or around the flame-head of the burner, provided the guard-plate have openings admitting the proper amount of air relatively to the capacity of the burner and the size of the upper outlets $d$ of the casing to maintain a slow upward current of very hot air around the fluid-receptacle C of the urn. The single central opening $a$ next the burner-head is, however, preferred, as the air admitted thereat is at once superheated to assure most economical heating of the contents of the fluid-receptacle.

I have fully demonstrated in practice that a very small Bunsen-burner head, (shown full size in Fig. 4 of the drawings,) consuming only about two feet of ordinary illuminating-gas per hour, is amply large to operate either of the urns shown and holding four or five gallons of fluid to their full capacity, this being about one-half of the fuel required to less satisfactorily heat other urns of like capacity not provided with the bottom guard-plate A, herein described. Furthermore, the use of this guard-plate with the very small burner promotes durability of the entire apparatus by preventing early destruction of the parts by a much larger and hotter burner-flame.

Having thus fully described my invention, I claim as new and desire to secure by Letters Patent—

1. An urn having an outer casing, a removable or interchangeable fluid-receptacle fitting the upper part of the casing and providing a hot-air space between the casing and receptacle, clamp-bolts engaging the casing and fluid-receptacle and holding the latter in place, and a removable guard-plate having or providing an atmospheric-air inlet-opening and held beneath the fluid-receptacle by the bolts which sustain this receptacle in the casing, substantially as described.

2. An urn having an outer casing, a removable or interchangeable fluid-receptacle fitting the upper part of the casing and providing a hot-air space between the casing and receptacle, clamp-bolts engaging the casing and fluid-receptacle and holding the latter in place, and a removable guard-plate having or providing an atmospheric-air inlet-opening and held beneath the fluid-receptacle by the bolts which sustain said receptacle in the casing, said bolts having nuts permitting removal of the guard-plate alone or both the guard-plate and fluid-receptacle at pleasure, substantially as described.

3. An urn having an outer casing provided with an upper hot-air outlet, a removable or interchangeable fluid-receptacle fitting the upper part of the casing and providing a hot-air space between the casing and receptacle, clamp-bolts engaging the casing and fluid-receptacle and holding the latter in place, a burner below the fluid-receptacle, and a removable guard-plate below said receptacle and having or providing an atmospheric-air inlet proportioned relatively to the casing hot-air outlet to maintain a slow upward current of hot air in the space around the fluid-receptacle within the casing, said guard-plate held by the bolts which sustain the fluid-receptacle in the casing, substantially as described.

4. In an urn, the combination, with the casing having an upper hot-air outlet, a fluid-receptacle sustained in the casing and providing a hot-air space between the casing and receptacle, and a burner below said receptacle, of a guard-plate beneath the receptacle, having or providing an atmospheric-air inlet proportioned relatively to the casing hot-air outlet to maintain a slow upward current of hot air in the space around the fluid-receptacle within the casing, substantially as described.

THOMAS MILLER.

Witnesses:
ALBERT BAEREUKLAU,
WILLIAM J. MILLER.